(12) United States Patent
Sekine (10) Patent No.: US 9,930,207 B2
(45) Date of Patent: Mar. 27, 2018

(54) INFORMATION PROCESSING APPARATUS, METHOD OF INITIALIZING A NON-VOLATILE STORAGE DEVICE, AND STORAGE MEDIUM

(71) Applicant: CANON KABUSHIKI KAISHA, Tokyo (JP)

(72) Inventor: Hiroshi Sekine, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/200,093

(22) Filed: Jul. 1, 2016

(65) Prior Publication Data
US 2017/0019556 A1 Jan. 19, 2017

(30) Foreign Application Priority Data

Jul. 17, 2015 (JP) .................................. 2015-143402

(51) Int. Cl.
*H04N 1/21* (2006.01)
*G06F 3/12* (2006.01)
*G06K 15/02* (2006.01)

(52) U.S. Cl.
CPC ..... *H04N 1/2104* (2013.01); *H04N 2201/218* (2013.01)

(58) Field of Classification Search
None
See application file for complete search history.

(56) References Cited

U.S. PATENT DOCUMENTS

| 6,125,424 A * | 9/2000 | Komatsu | G11C 29/76 711/103 |
| 6,367,992 B1 * | 4/2002 | Aruga | B41J 29/393 400/61 |
| 6,430,662 B1 * | 8/2002 | Hurich | G11C 16/102 711/162 |
| 6,516,440 B1 * | 2/2003 | Teradaira | G06K 15/00 714/763 |
| 9,135,541 B2 * | 9/2015 | Oku | G06K 15/408 |
| 2005/0015652 A1 * | 1/2005 | Han | G06F 11/1458 714/6.11 |
| 2005/0060699 A1 * | 3/2005 | Kim | G06F 11/1433 717/168 |

(Continued)

FOREIGN PATENT DOCUMENTS

JP 4479633 B2 6/2010
JP 5574858 B2 8/2014

*Primary Examiner* — Beniyam Menberu
(74) *Attorney, Agent, or Firm* — Fitzpatrick, Cella, Harper & Scinto (57) ABSTRACT

There are provided an information processing apparatus including a non-volatile storage device, and a method of initializing the non-volatile storage device. The non-volatile storage device is managed by a plurality of partitions. When an instruction to initialize the non-volatile storage device is issued, data indicating a use history of the information processing apparatus is saved from a first partition storing the setting data and the data indicating the use history. A Partition which includes data subjected to the initialization is erased. The same partition as that before the erasure is created in the erased area. Setting data, which is stored in the storage unit storing an initial value of the setting data, and the saved data indicating the use history are written in the first partition of the created partitions.

8 Claims, 9 Drawing Sheets

(56) References Cited

U.S. PATENT DOCUMENTS

| | | | |
|---|---|---|---|
| 2005/0066145 A1* | 3/2005 | Han | G06F 9/441 |
| | | | 711/173 |
| 2006/0080522 A1* | 4/2006 | Button | G06F 9/4403 |
| | | | 713/2 |
| 2007/0233636 A1* | 10/2007 | Kato | G06F 21/608 |
| 2009/0219569 A1* | 9/2009 | Hara | G06F 3/1286 |
| | | | 358/1.15 |
| 2011/0157653 A1* | 6/2011 | Oku | G06K 15/408 |
| | | | 358/1.16 |
| 2012/0011305 A1 | 1/2012 | Mikami | 711/103 |
| 2012/0215968 A1* | 8/2012 | Uematsu | G11C 16/16 |
| | | | 711/103 |
| 2012/0320423 A1* | 12/2012 | Kobayashi | G06K 15/1821 |
| | | | 358/1.16 |
| 2013/0304980 A1* | 11/2013 | Nachimuthu | G06F 12/0246 |
| | | | 711/103 |
| 2014/0089568 A1* | 3/2014 | Chung | G06F 12/0246 |
| | | | 711/103 |
| 2015/0178188 A1* | 6/2015 | Grin | G06F 12/0246 |
| | | | 711/103 |

* cited by examiner

JOB IS BEING EXECUTED.
PLEASE TRY IT AGAIN AFTER
COMPLETION OF
PROCESSING OF THE JOB.

FIG. 8B

INITIALIZATION PROCESSING IS
BEING PREPARED.

FIG. 8C

INITIALIZATION
PROCESSING ERROR

FIG. 8D

BEING STARTED UP

ND STORAGE DEVICE, AND
INFORMATION PROCESSING APPARATUS, METHOD OF INITIALIZING A NON-VOLATILE STORAGE DEVICE, AND STORAGE MEDIUM

BACKGROUND OF THE INVENTION

Field of the Invention

The present invention relates to an information processing apparatus, a method of initializing a non-volatile storage device, and a storage medium.

Description of the Related Art

As a technique of returning the settings of a device to the factory default settings, for example, Japanese Patent. No. 4479633 discloses a technique of returning the set values of a device to the factory default settings by a simple user operation. In addition, as a technique of securely erasing job information in an image forming apparatus, for exam Japanese Patent No. 5574858 discloses a technique of erasing an encryption key in an encryption module upon completion of the processing of encrypted data stored in a non-volatile storage area.

When, however, the data in a device is returned to factory default data after securely erasing user's recorded data and job information, even information like the total number of printed sheets counted in the device is returned to factory default information. This poses a problem that after the execution of such data erasure, the device cannot be discriminated from a new product in terms of data.

SUMMARY OF THE INVENTION

An aspect of the present invention is to eliminate the above-mentioned problems with conventional technology.

A feature of the present invention is to provide a technique of reliably erasing erasure target data stored in a non-volatile storage device upon issuance of an instruction to initialize the device and allowing discrimination between data stored in the non-volatile storage device after the initialization and the factory default data.

According to a first aspect of the present invention, there is provided an information processing apparatus including a non-volatile storage device, the apparatus comprising: a storage unit configured to store an initial value of setting data in the information processing apparatus; a saving unit configured to, in a case that the non-volatile storage device is managed by a plurality of partitions and an instruction to initialize the non-volatile storage device is issued, save data indicating a use history of the information processing apparatus from a first partition storing the setting data and the data indicating the use history; an erasing unit configured to erase a partition, of the plurality of partitions, which includes data subjected to the initialization and data that is stored in the partition; a creation unit configured to create the same partition as that before the erasure in an area erased by the erasing unit; and a writing unit configured to write the setting data stored in the storage unit and the data indicating the use history saved by the saving unit in the first partition, of partitions created by the creating unit, which has stored the data indicating the use history.

According to a second aspect of the present invention, there is provided a method of initializing a non-volatile storage device in an information processing apparatus that includes the non-volatile storage device, the method comprising: managing the non-volatile storage device by a plurality of partitions; saving data indicating a use history of the information processing apparatus from a first partition that stores the setting data and the data indicating the use history when an instruction to initialize the non-volatile storage device is issued; erasing a partition, of the plurality of partitions, which includes data subjected to the initialization and data stored in the partition; creating the same partition as that before the erasure in the erased area; and writing setting data in the information processing apparatus stored in the storage unit that stores an initial value of the setting data in the information processing apparatus and the saved data indicating the use history in the first partition, of the created partitions, which has stored the data indicating the use history.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that an information processing apparatus according to the present invention will be described below by taking an image forming apparatus according to an embodiment as an example. The present invention is not, however, limited to this, and can be applied to, for example, a communication apparatus, a computer device such as a PC, a printing apparatus, and a multi-function peripheral.

Figure 1:
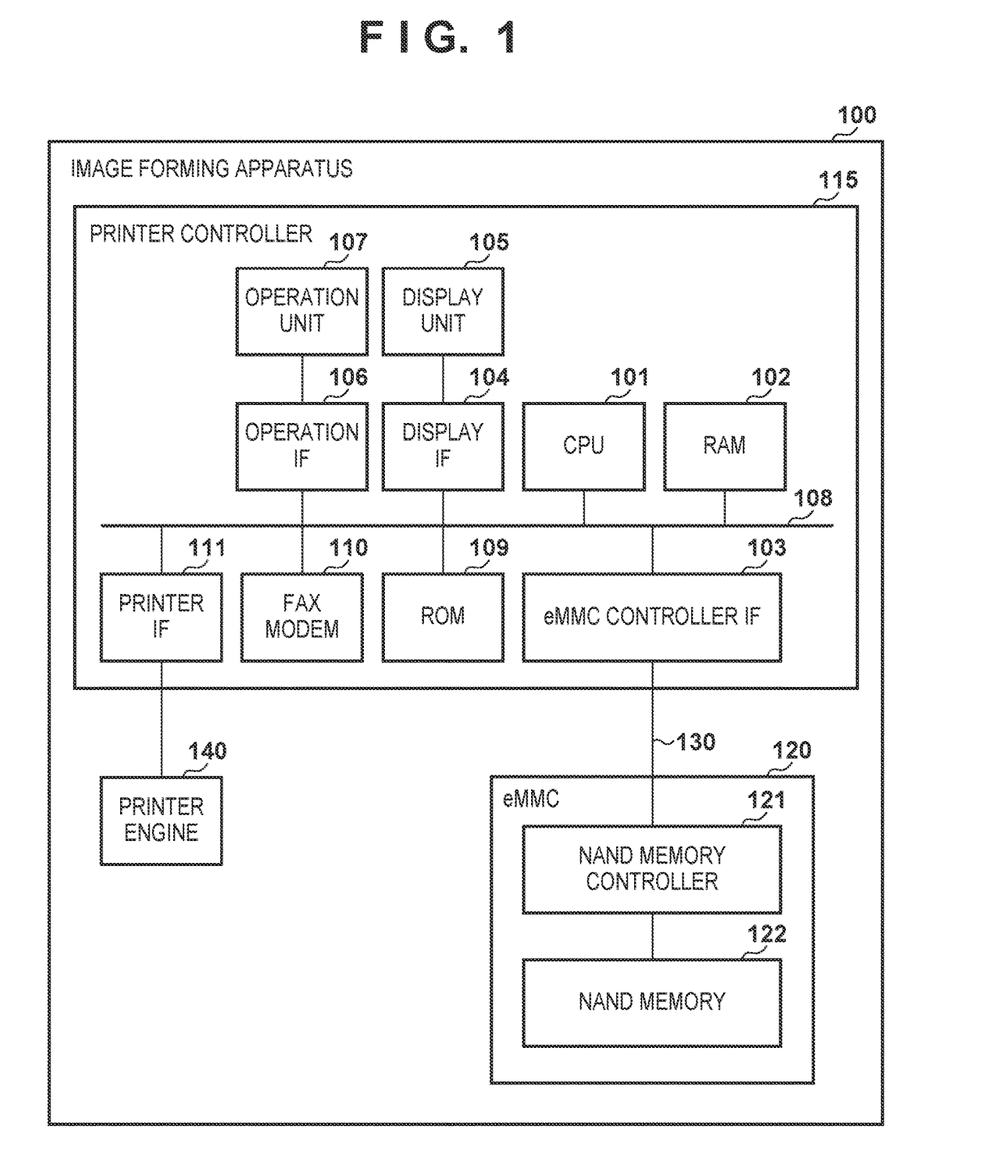
FIG. 1 is a block diagram for explaining the hardware arrangement of an image forming apparatus according to an embodiment of the present invention.

FIG. 1 is a block diagram for explaining the hardware arrangement of an image forming apparatus 100 according to an embodiment of the present invention.

A printer controller (control unit) 115 is connected to an eMMC (embedded Multi Media Card) 120 via a bus 130. The eMMC 120 is a non-volatile storage device designed as an embedded device using a flash memory, which has a NAND flash memory and a control circuit integrated into one package and is connected via the same interface as that for an MMC (Multi Media Card). A CPU 101 of the printer controller 115 is a CPU which controls the overall printer controller 115, and also performs various types of arithmetic operations by executing programs deployed in a RAM 102. The RAM 102 provides a system work memory for the operation of the CPU 101. The CPU 101 loads data and a program from the eMMC 120 or the like into the RAM 102, and executes an arithmetic operation, various control operations, and the like in accordance with the program. An eMMC controller IF (Interface) 103 controls access to the eMMC 120 via the bus 130 under the control of the CPU 101. A display IF 104 is connected to a display unit 105 and sends a display signal to the display unit 105. The display unit 105 includes a display panel, an LED, and the like, and presents information to the user. An operation IF 106 is connected to an operation unit 107. The operation unit 107 includes a touch panel, buttons, and the like. The operation IF 106 receives an operation performed by the user from the operation unit 107 via the touch panel, buttons, or the like as an electrical signal. Note that when the display unit 105 has a touch panel function, the display unit 105 and the operation unit 107 are integrally formed.

A ROM 109 is, for example, a flash memory, which is a non-volatile memory which saves a startup program, factory default data, and a user data initialization flag (to be described later with reference to FIG. 2). A FAX modem 110 is a modem which transmits and receives FAX data, and is connected to a telephone line (not shown). FAX reception data is temporarily saved as a FAX reception image data file in the eMMC 120. FAX transmission data also temporarily saved as a FAX transmission image data file in the eMMC 120. A printer IF 111 is connected to a printer engine 140. The printer IF 111 sends print data and a print control command to the printer engine 140, and receives responses from the printer engine 140. These units are connected to each other via a bus 108.

The eMMC 120 includes a NAND memory controller 121 and a NAND memory (NAND flash memory) 122. The NAND memory controller 121 is connected to the eMMC controller IF 103 via the bus 130. The NAND memory controller 121 receives a command from the eMMC controller IF 103, and sends data and a response to the eMMC controller IF 103 via the bus 130 in accordance with the received command. Commands to be received by the NAND memory controller 121 include a security erasing command, a write command, and a read command. The NAND memory controller 121 is connected to the NAND memory 122, and analyzes a command received from the eMMC controller IF 103. If the received command is a security erasing command, the NAND memory controller 121 securely erases data recorded on the NAND memory 122. If the received command is a write command, the NAND memory controller 121 writes data received from the eMMC controller IF 103 via the bus 130 in the NAND memory 122. If the received command is a read command, the NAND memory controller 121 reads out data from the NAND memory 122, and transmits the readout data to the printer controller 115 via the bus 130.

The eMMC 120 has a wear leveling function which performs data rewriting in storage devices of a storage medium as evenly as possible, and performs control to prevent intensive data writing at specific physical addresses in the NAND memory 122. When the NAND memory controller 121 receives a write command, the eMMC 120 analyzes the logical address information contained in the command, and finds a physical address in the NAND memory 122 at which data is to be actually written. The eMMC 120 then compares the number of writing times for the found physical address with the numbers of writing times for other unused physical addresses in the memory, and executes writing at a physical address for which there is a small number of writing times. In this manner, the NAND memory controller 121 writes data at a physical address corresponding to the logical address. For this reason, even if the eMMC controller IF 103 issues a write command to the eMMC 120 to indicate the same logical address and perform overwriting, the data sometimes remains at the indicated address without being overwritten. In addition, data at a physical address which does not correspond to the logical address remains in the NAND memory 122 without being overwritten.

Figure 2:
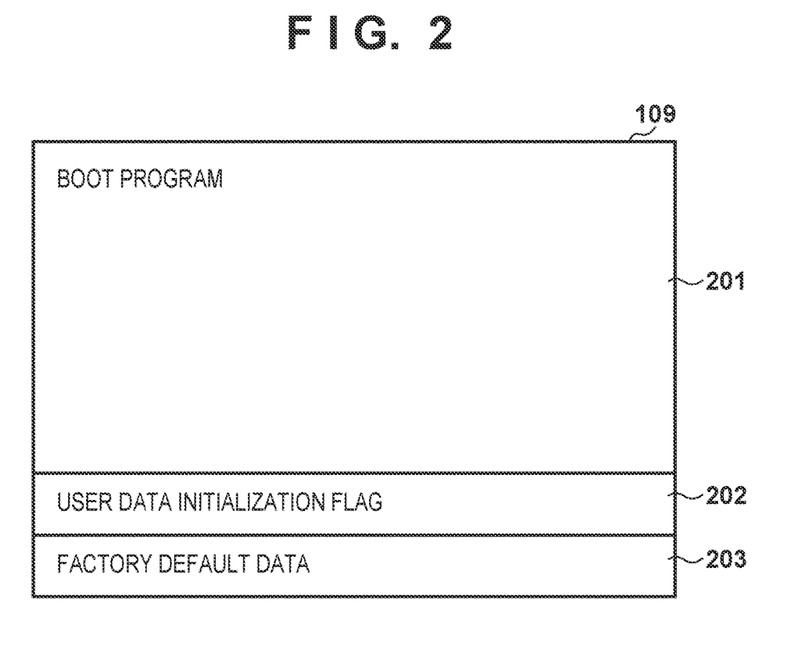
FIG. 2 depicts a view for explaining data stored in a ROM in the image forming apparatus according to this embodiment.

FIG. 2 depicts a view for explaining data stored in the ROM (non-volatile memory) 109 in the image forming apparatus 100 according to this embodiment.

A boot program 201 is stored in the ROM 109. The ROM 109 stores a startup program for the image forming apparatus 100. When the CPU 101 starts up, the CPU 101 first reads out and executes the boot program 201. By executing the boot program 201, the CPU 101 reads out data and a program from the eMMC 120 and deploys them in the RAM 102, thereby enabling the execution of the program. A user data initialization flag 202 is a flag indicating whether to initialize the user data. When the user initializes the user data, the flag 202 is set to ON. Factory default data 203 is an area in which initial setting data (initial values) at the time of factory shipment is saved. At the time of factory shipment, factory default setting data is written in this area.

FIGS. 3A to 5 depict views for explaining the transition of the arrangement of data in the eMMC 120 in the image forming apparatus 100 according to the embodiment.

Figure 3A:
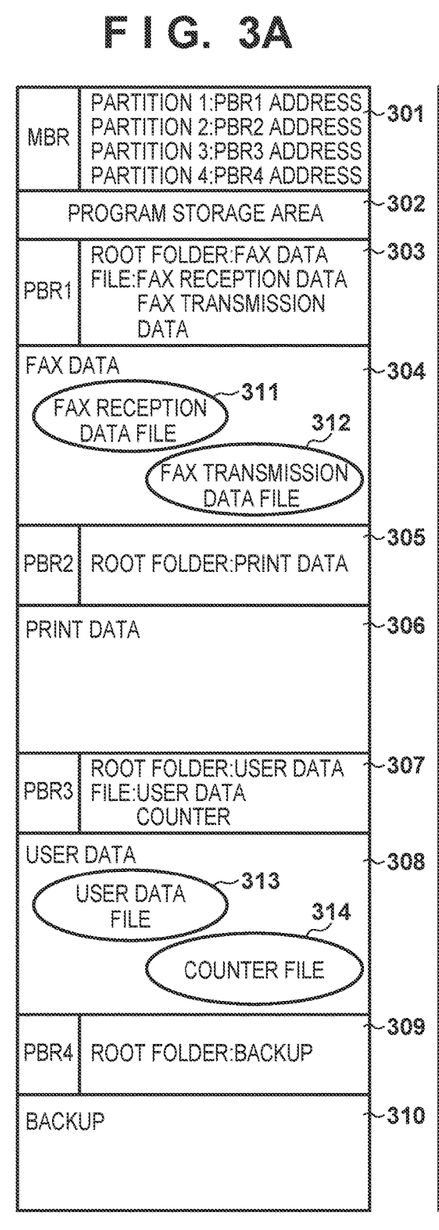
FIG. 3A depicts a view showing the arrangement of internal data in an eMMC after the user has used the image forming apparatus to some extent.

FIG. 3A shows the arrangement of internal data in the eMMC 120 after a user has used the image forming apparatus 100 to some extent.

The CPU 101 executes the boot program 201 to read out a program from a program storage area 302, deploys the program in the RAM 102, and execute it. The eMMC 120 has an area for a master boot record 301 (to be referred to as the MBR hereinafter), on which data indicating a plurality of pieces of partition information of the data in the eMMC 120 is recorded. As this partition information, data indicating a specific address from which a partition starts is recorded. The CPU 101 recognizes the partition based on this data. In this embodiment, the MBR 301 records four partitions indicated by partition boot records 1 to 4. In this case, partition boot record 1 is represented by PBR1 (303), partition boot record 2 by PBR2 (305), partition boot record 3 by PBR3 (307), and partition boot record 4 by PBR4 (309).

A program executed by the CPU 101 reads out the MBR 301, and reads out the start addresses of PBR1 (303), PBR2 (305), PBR3 (307), and PBR4 (309) from the partition information written in the MBR 301. This program recognizes the existence of the partitions, and makes them available to software. Such processing is generally called volume mounting.

PBR1 (303), PBR2 (305), PBR3 (307), and PBR4 (309) describe the start addresses and sizes of data areas managed by the respective partitions. They also record data areas describing information about files and folders managed by the respective partitions. A file or folder is erased by setting data describing the information about the file or folder in an erased state. At this time, therefore, the actual file data or folder data is not erased. Even if a file or folder is erased, it is possible to restore the file or folder by restoring the information about the file or folder.

In partitions 1 to 4 in the MBR 301 in FIG. 3A, the start addresses of corresponding PBR1 (303) to PBR4 (309) are stored. PBR1 (303) describes "FAX data" as a root folder name, "FAX reception data" as a file, and "FAX transmission data". The root folder name is the highest-order name of the target partition, and is also the partition name. The highest-order folder name of a partition is generally assigned with a name like "C:", and is also often called C drive or the like. In the case in FIG. 3A, a FAX reception data file 311 and a FAX transmission data file 312 are stored in a FAX data area 304.

In PBR2 (305), the root folder name is "print data". In the case in FIG. 3A, no print data file exists in a print data area 306.

In PBR3 (307), the root folder name is "user data", and "user data" and "counter" files exist. In the case in FIG. 3A, a user data area 308 stores a user data file 313 in which user setting data is written and a counter file 314 recording the total number of printed sheets having undergone printing.

In PBR4 (309), the root folder name is "backup". In the case in FIG. 3A, there is no file to be backed up in a backup area 310.

If the data in partition boot records PBR1 to PBR4 are erased in this state, even if data in the data areas 304, 306, 308 managed by the partitions are not erased, the program executed by the CPU 101 determines that there is no data in the partitions.

Figure 3B:
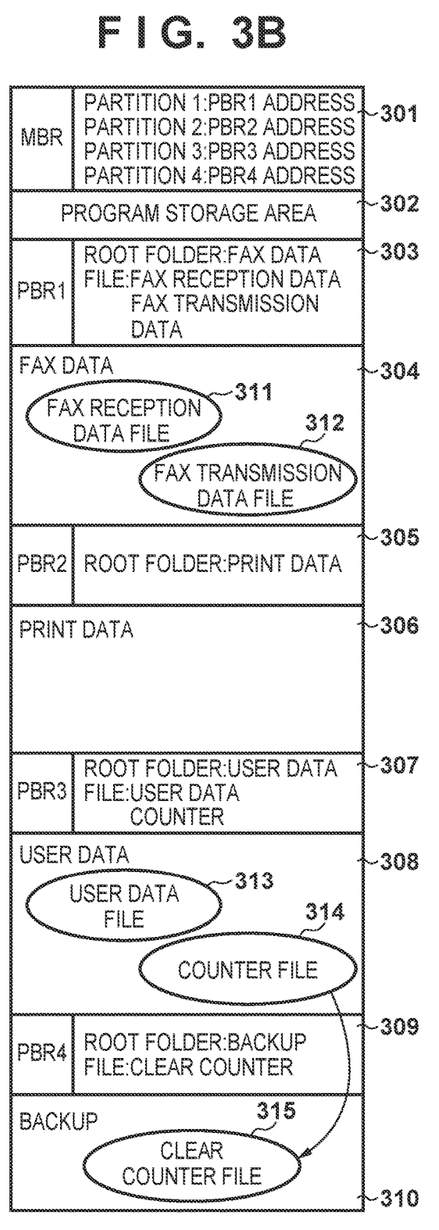
FIG. 3B depicts a view showing preparation for the erasure of data in the eMMC.

FIG. 3B depicts a view for explaining preparation for the erasure of data in the eMMC 120.

When the user initializes data in the eMMC 120, the CPU 101 reads out the counter file 314 in the user data area 308 from the eMMC 120 via the eMMC controller IF 103, and temporarily saves the file 314 in the RAM 102. The CPU 101 then initializes all the FAX data area 304, the print data area 306, and the user data area 308 except for the data of the total number of printed sheets saved in the RAM 102. Thereafter, the CPU 101 saves a clear counter file 315 in the backup area 310 managed by PBR4 (309). In this manner, the clear counter file 315 is stored in the backup area 310 in PBR4 (309). In this case, in PBR4 (309), the root folder name is "backup", and the file is "clear counter".

Figure 4A:
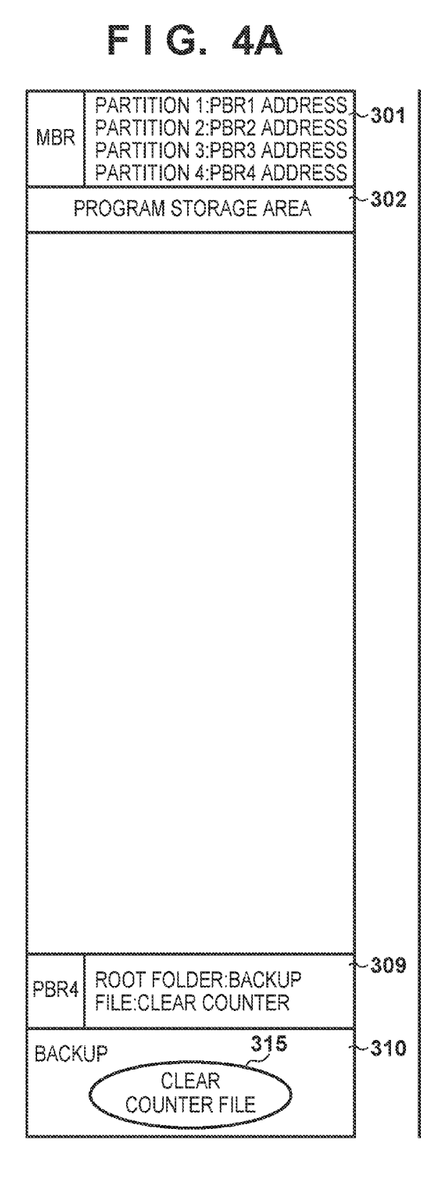
FIG. 4A depicts a view showing the arrangement of data after the erasure of FAX data, print data, and user data in the eMMC.

FIG. 4A depicts a view showing the arrangement of data after the data in the FAX data area, the print data area, and the user data area in the eMMC 120 are erased.

Referring to FIG. 4A, as described with reference to FIG. 3B, the CPU 101 saves the clear counter file 315 in the backup area 310, and then erases all the data in PBR1 to PBR3 in the eMMC 120 via the eMMC controller IF 103. At this time, the CPU 101 physically erases the data in the memory address areas managed by PBR1 to PBR3 and the data at physical addresses which do not correspond to the logical addresses. With this processing, it is possible to reliably erase the file information and the folder information stored in PBR1 to PBR3 (303, 305, and 307) and the user data file 313 storing user setting data in the user data area 308. In addition, it is possible to reliably erase the FAX reception data file 311 and the FAX transmission data file 312 in the FAX data area 304. In the case in FIG. 3B, there is no print data file in the print data area 306. If, however, such a print data file exists, the file can be reliably erased.

Figure 4B:
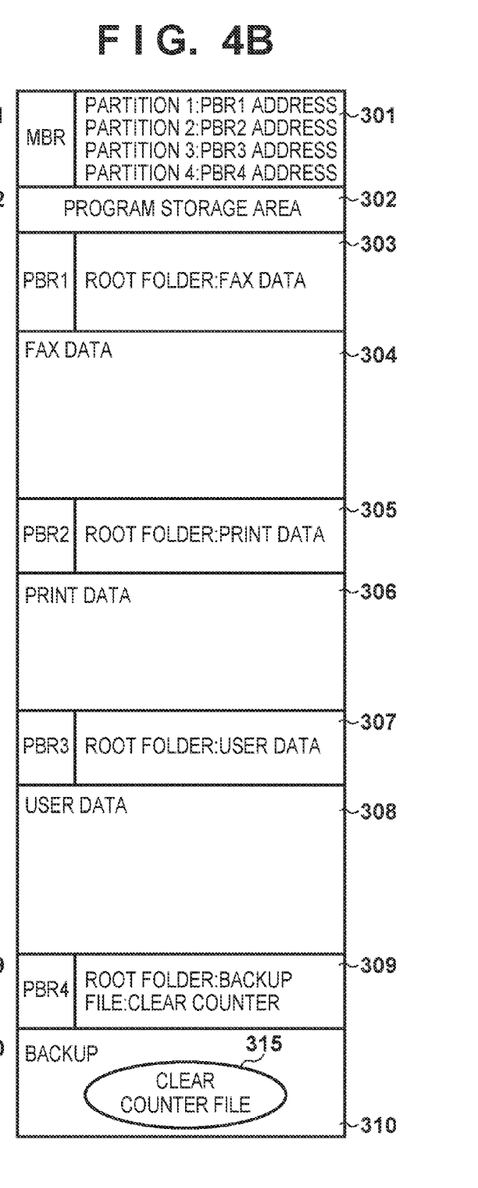
FIG. 4B depicts a view showing a data area when the partitions in the eMMC are restored after the erasure of data in the eMMC.

FIG. 4B depicts a view showing a data area when the partitions of the eMMC 120 are restored after the erasure of all the data except for the data in the MBR 301, the program storage area 302, PBR4 (309), and the backup area 310 in the eMMC 120. In this case, the same reference numerals denote parts common to those in FIG. 3B.

The CPU 101 reads out data in the MBR 301 from the eMMC 120 via the eMMC controller IF 103 and checks the partition information. The CPU 101 then tries to read out PBR1, PBR2, PBR3, and PBR4 based on the partition information in the MBR 301. In this case, however, since PBR1, PBR2, and PBR3 are not present, the CPU 101 determines that there are no partitions, and restores these partitions. When restoring these partitions, the CPU 101 creates PBR1, PBR2, and PBR3 as in FIG. 4A based on the information in the MBR 301. Note that in this partition restoration, partition information may be restored from a program in the program storage area 302 or partition information held by a program of the boot program 201. Upon restoring these partitions, the CPU 101 makes the partitions available to software.

Figure 5:
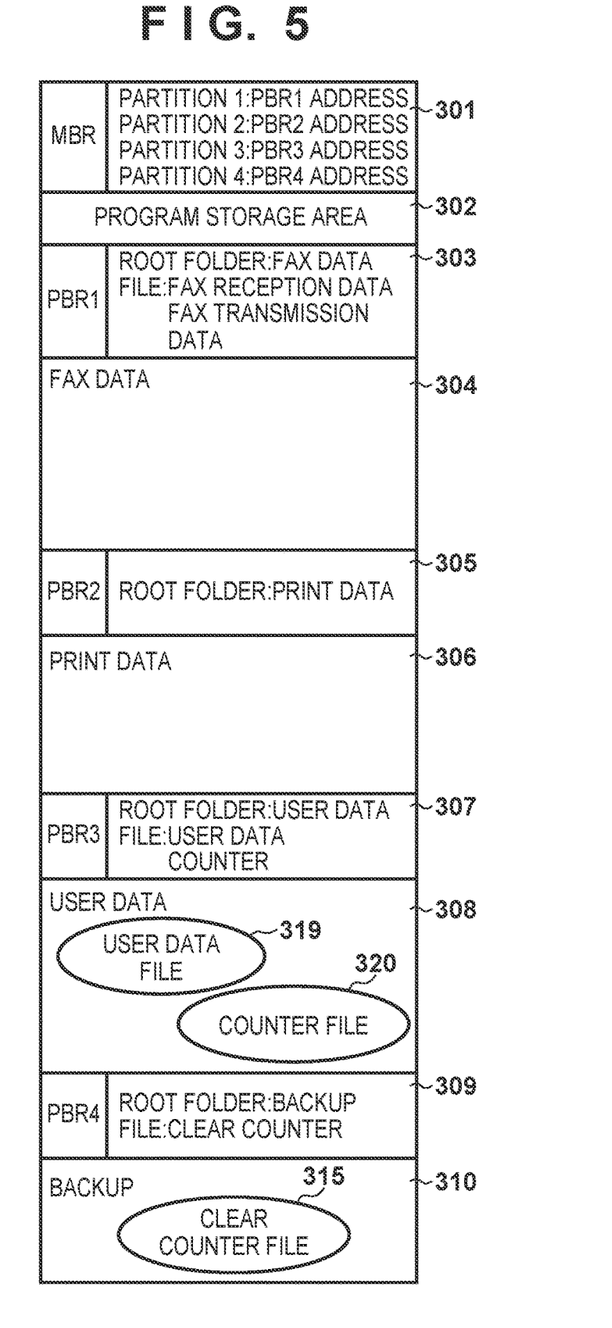
FIG. 5 depicts a view showing a state in which data is restored after the restoration of the partitions in the eMMC.

FIG. 5 depicts a view showing a state in which user data is restored after the restoration of the partitions in the eMMC 120.

The CPU 101 loads the factory default setting data saved in the factory default data 203 shown in FIG. 2 into the RAM 102 in accordance with a program saved in the program storage area 302 or a program saved in the boot program 201. The CPU 101 creates a file from the setting data loaded in this manner, and saves the file as a user data file 319 in the user data area 308 managed by PBR3 (307) via the eMMC controller IF 103.

The CPU 101 also reads out the clear counter file 315 saved in the backup area 310, which has been cleared in FIG. 3B, and loads the file 315 in the RAM 102. The CPU 101 writes the clear counter file 315, loaded in the RAM 102, as a counter file 320 in the user data area 308 managed by PBR3 (307) which is the restored partition information. That is, the clear counter file 315 in the backup area 310 is saved as a file assigned with a different name in the user data area 308. Upon saving the counter file 320 in the user data area 308 in this manner, the CPU 101 erases the clear counter file 315 in the backup area 310. In this erasure processing, the CPU 101 initializes the file information of PBR4 (309) and sets the clear counter file in an erased state. For this reason, the clear counter file 315 is left in the backup area 310 managed by PBR4 (309). For the sake of security, therefore, the CPU 101 physically erases the data in the backup area 310 managed by PBR4 (309), the data in PBR4 (309), and data at physical addresses which do not correspond to the logical addresses. Subsequently, as described with reference to FIG. 4B, the CPU 101 may restore the partition of PBR4.

With these processes, the data in the eMMC 120 are initialized to the factory default data, while the total number of printed sheets, which indicates a use history of this apparatus and is information before the initialization, is saved as the counter file 320. After the completion of these processes, the user data initialization flag 202 in the ROM (non-volatile memory) 109 is set to OFF.

Figure 6A:
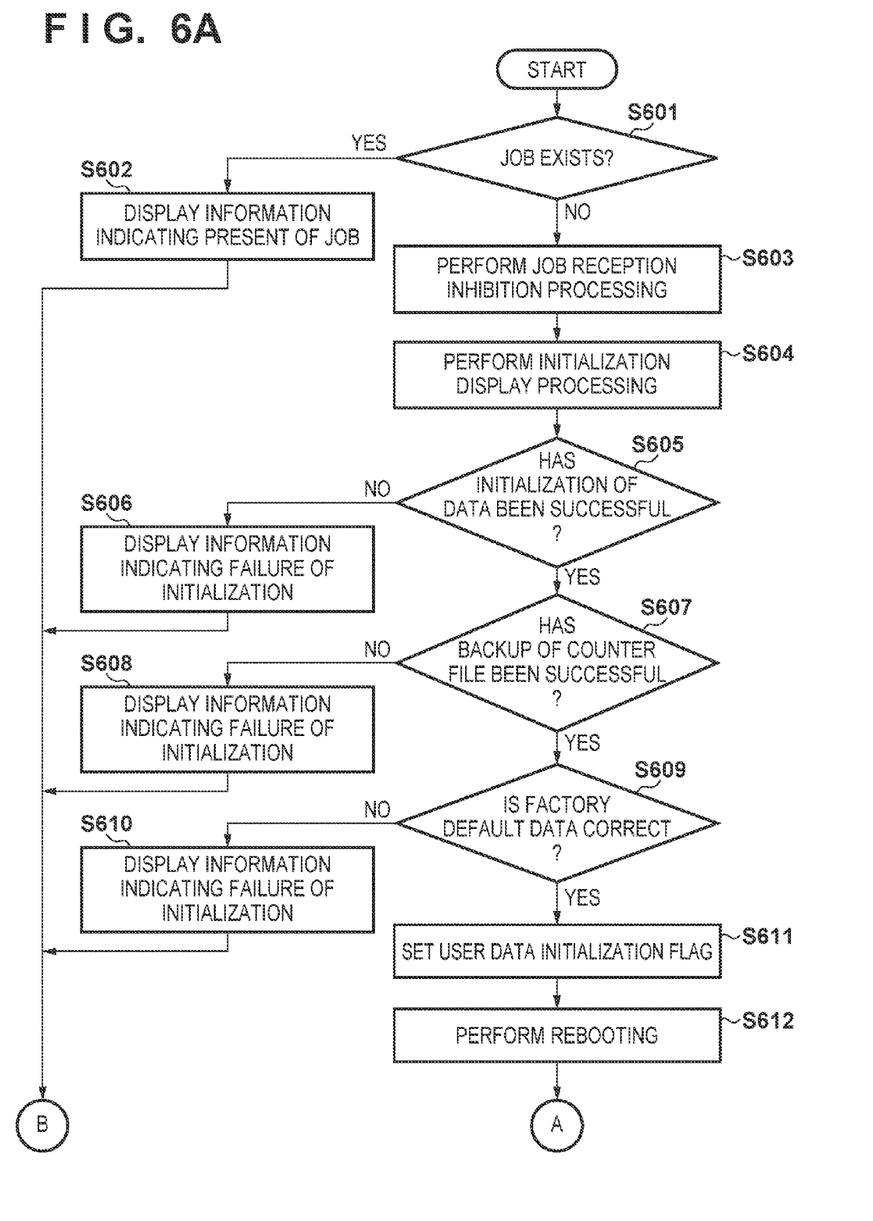
FIGS. 6A and 6B are flowcharts for describing processing by a printer controller of the image forming apparatus according to this embodiment when initializing data in the eMMC.
Figure 6B:
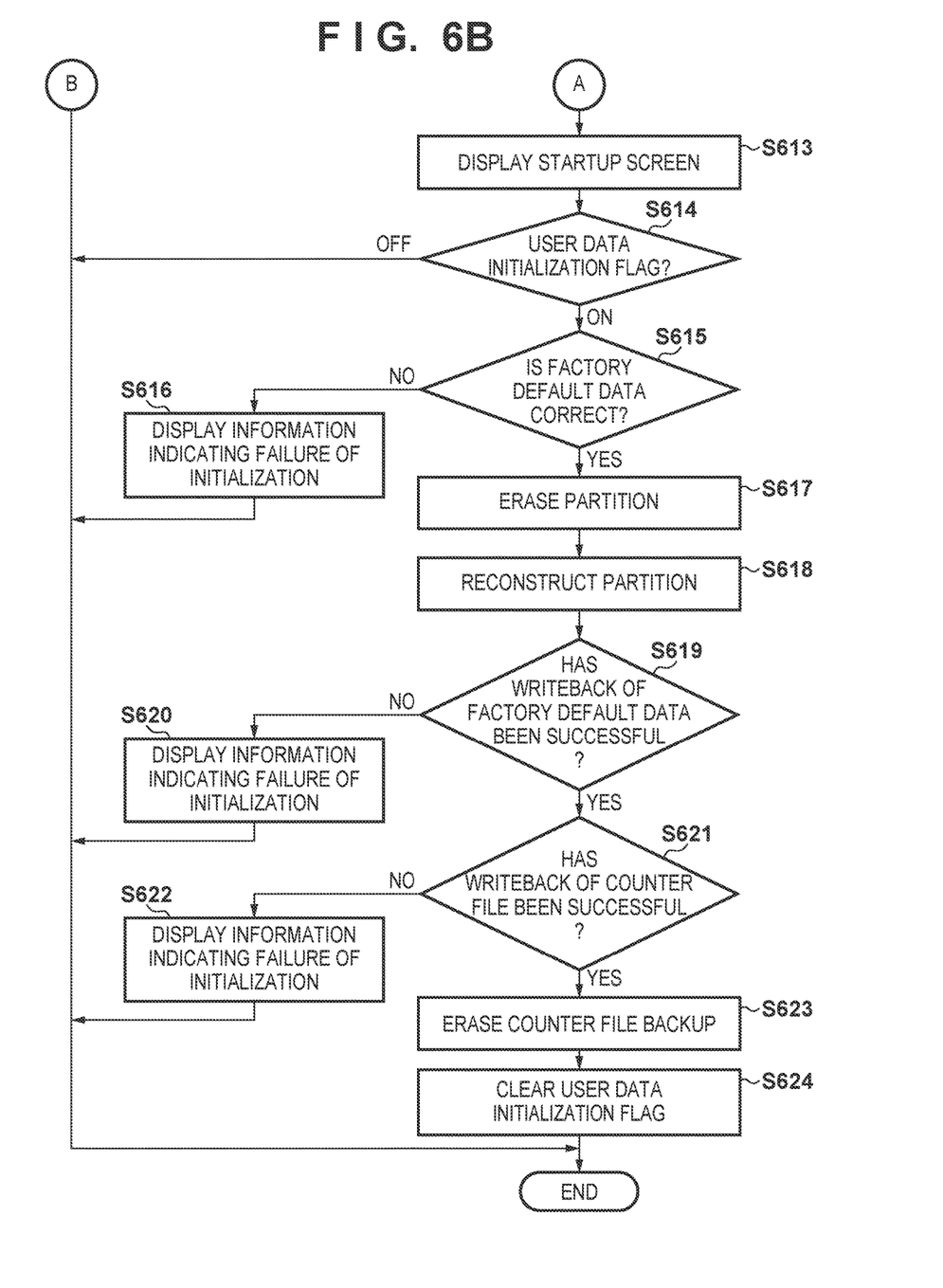

FIGS. 6A and 6B are flowcharts for describing processing by the printer controller 115 of the image forming apparatus 100 according to this embodiment when initializing data in the eMMC 120. Note that a program for executing this processing is stored in, for example, the program storage area 302 of the eMMC 120, and the CPU 101 deploys the program in the RAM 102 to execute it, thereby implementing the processing shown in this flowchart. This processing starts when, for example, the user issues an instruction to perform initialization processing of data in the eMMC 120 via the operation unit 107.

Figure 8A:
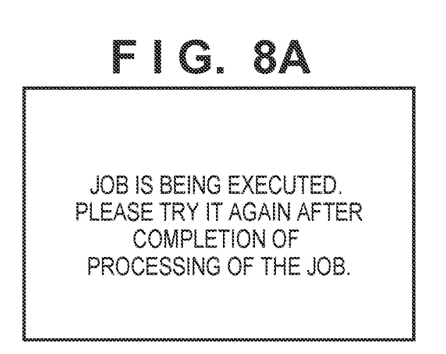
FIGS. 8A to 8D depict views each showing a screen example displayed on the display unit of the image forming apparatus according to this embodiment.

When this processing starts, first of all, the CPU 101 determines in step S601 whether a job such as a print job is being executed or is on standby. If a print job or the like is being executed or is on standby, the process advances to step S602, in which the CPU 101 displays, on the display unit 105, information indicating that initialization processing cannot be executed because of the presence of a job, and terminates the processing. FIG. 8A shows a screen example displayed in step S602.

Figure 8B:
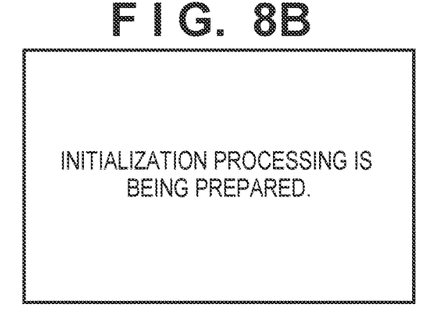

If the CPU 101 determines in step S601 that there is no job which is being executed or is on standby, the process advances to step S603, in which the CPU 101 inhibits the reception of a job so as not to receive any job during the initialization processing of data in the eMMC 120. The process then advances to step S604, in which the CPU 101 displays, on the display unit 105, information indicating that data in the RAM 102 are being initialized to notify the user that data in the eMMC 120 are being initialized. FIG. 8B shows a screen example displayed in step S604.

Figure 8C:
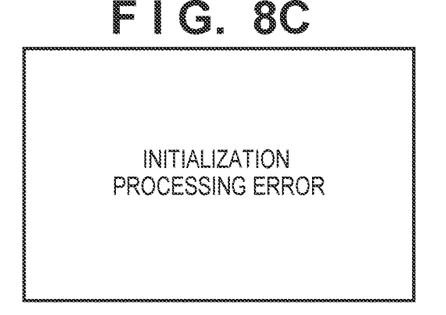

The process then advances to step S605, in which the CPU 101 reads out data in the user data area 308 in PBR3, and initializes the data except for the counter file 314 indicating how much the image forming apparatus 100 has been used, for example, the total number of printed sheets, in the same manner as that described with reference to FIG. 3B. The CPU 101 then saves the initialized data in the RAM 102. When restoring the data of the user data file initialized at this time, values saved in the program storage area 302 or data saved in the factory default data 203 are used. In step S605, the CPU 101 determines whether or not the initialization of this data has been successful. If the CPU 101 determines that the initialization has been successful, the process advances to step S607, otherwise, the process advances to step S606, in which the CPU 101 displays information indicating the failure of the initialization on the display unit 105, and terminates the processing. FIG. 8C shows a screen example displayed in step S606.

In step S607, the CPU 101 creates the clear counter file 315 from the counter file 314 in the user data area 308 by initializing data except for data indicating how much the image forming apparatus 100 has been used, for example, the total number of printed sheets. The CPU 101 then saves the clear counter file 315 in a partition set in the eMMC 120 which is different from the partition in which the counter file 314 is saved. Referring to FIG. 3B, the CPU 101 saves the clear counter file 315 in the backup area 310 in PBR4. Note that the CPU 101 may keep saving the clear counter file 315 in the RAM 102 without writing it in the eMMC 120. The CPU 101 then determines whether or not the initialization of the counter file 314 and the creation of the clear counter file 315 have been successful. If they have been successful, the process advances to step S609, otherwise, the process advances to step S608 to display the failure of the creation of a backup file on the display unit 105 and terminate the processing. FIG. 8C shows a screen example displayed in step S608.

In step S609, the CPU 101 determines whether or not the factory default setting data saved in the factory default data 203 in the ROM 109 is correct. It is possible to use a known method of determining whether or not the data is correct. For example, the CPU 101 may check an electronic signature or checksum. In this case, if the CPU 101 determines that the data is correct, the process advances to step S611. In contrast to this, if the CPU 101 determines that the data is not correct, the process advances to step S610, in which the CPU 101 displays the failure of the initialization processing of the user's recorded data on the display unit 105, and terminates the processing. FIG. 8C shows a screen example displayed in step S610.

In step S611, the CPU 101 sets the user data initialization flag 202 in the ROM 109 to ON. Setting user data initialization flag 202 to ON makes it possible, even if the power supply is turned off during subsequent processing because of some cause, to re-execute initialization of user's recorded data from display processing of a startup screen in step S613 (to be described later) as long as the flag 202 is ON at the time of startup. In this manner, even if some kind of problem occurs during erasure of data saved in the eMMC 120, initialization can be re-executed.

Figure 8D:
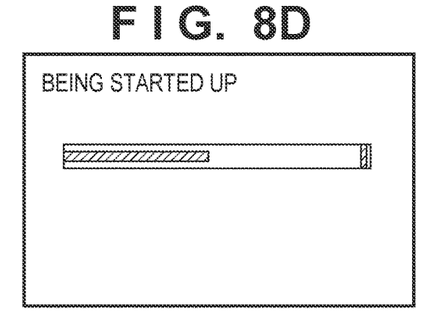

Subsequently, the process advances to step S612, in which the CPU 101 restarts the printer controller 115. The process then advances to step S613. In this case, if the clear counter file 315 is kept saved in the RAM 102 without being saved in the eMMC 120 in step S607, the process advances to step S617 without restarting the printer controller 115. In step S613, the CPU 101 displays a screen indicating "starting up" on the display unit 105. FIG. 8D shows a startup screen example displayed in step S613. Note that in step S613, instead of a screen indicating "starting up", the CPU 101 may display a screen which prompts to check the user data initialization flag 202 written in step S611 and initialize user data if the flag is ON.

The process then advances to step S614, in which the CPU 101 determines whether or not the user data initialization flag 202 written in step S611 is ON. If the flag is ON, the process advances to step S615. If the flag is OFF, the CPU 101 immediately terminates the processing. In step S615, as in step S609, the CPU 101 determines whether or not the factory default setting data saved in the factory default data 203 is correct. If the CPU 101 determines that the factory default setting data is correct, the process advances to step S617, otherwise, the process advances to step S616, in which the CPU 101 displays information indicating the failure of the initialization of the user's recorded data on the display unit 105, and terminates the processing. Note that in step S616, the CPU 101 may terminate the processing upon setting the user data initialization flag 202 to OFF to inhibit reexecution of initialization processing of the user's recorded data. FIG. 8C shows a screen example displayed in step S616.

In step S617, the CPU 101 physically completely erases the data in the areas managed by PBR1, PBR2, and PBR3 in the eMMC 120 and data at physical addresses which do not correspond to the logical addresses in the manner described with reference to FIG. 4A. That is, as shown in FIG. 4A, the partitions of PBR1, PBR2, and PBR3 and the data in them are completely erased. The process then advances to step S618, in which the CPU 101 restores the partitions in the eMMC 120 by referring to the MBR 301 in the eMMC 120 in the manner described with reference to FIG. 4B. The process then advances to step S619.

In step S619, the CPU 101 reads out factory default data from the factory default data 203 in the ROM 109, and writes the data as the user data file 319 in the partition managed by PBR3 (307) restored in step S618 (see FIG. 5).

If the CPU 101 determines that the writing back of the user data file 319 as factory default data has been successful, the process advances to step S621, otherwise, the process advances to step S620, in which the CPU 101 displays information indicating the failure of the initialization of the user's recorded data on the display unit 105, and terminates the processing. FIG. 8C shows a screen example displayed in step S620.

In step S621, the CPU 101 writes back the clear counter file 315 as the counter file saved in step S607 to the partition of PBR3 restored in step S618. If the CPU 101 determines that the writing back of the counter file 320 has been successful, the process advances to step S623, otherwise, the process advances to step S622, in which the CPU 101 displays information indicating the failure of the initialization of the user's recorded data on the display unit 105, and terminates the processing. FIG. 8C shows a screen example displayed in step S622.

In step S623, the CPU 101 erases the clear counter file 315 in the backup area 310 in PBR4. For the sake of security, after physically completely erasing the data in the backup area 310 managed by PBR4 (309) and data at physical addresses which do not correspond to the logical addresses in the partition, the CPU 101 may restore the partition managed by PBR4. With these processes, the data in the eMMC 120 is initialized to the factory default data, while the total number of printed sheets, which indicates a use history of this apparatus, is restored to the initial information before the initialization. In step S624, the CPU 101 sets the user data initialization flag 202 in the ROM 109 to OFF, and terminates the processing.

Figure 7A:
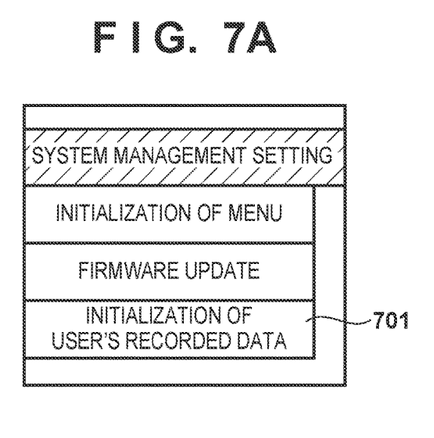
FIGS. 7A and 7B depict views each showing a screen example for the issuance of an instruction to initialize user's recorded data in the image forming apparatus according to the embodiment.

FIG. 7A shows a screen example for issuing an instruction to initialize user's recorded data in the image forming apparatus 100 according to this embodiment.

Figure 7B:
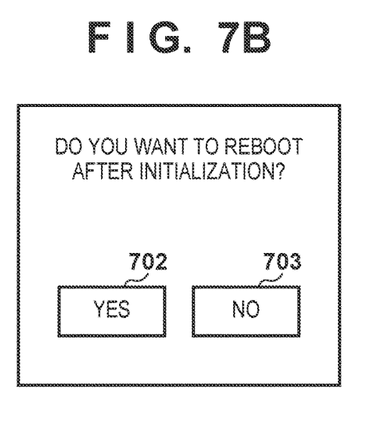

FIG. 7A depicts a view illustrating an example of a menu screen for issuing an instruction to initialize user's recorded data. When the user issues an instruction to perform user's recorded data initialization 701, a confirmation screen shown in FIG. 7B is displayed. When the user selects a "YES" button 702 on the screen in FIG. 7B, the initialization processing of user's recorded data starts, and the processing indicated by the flowcharts of FIGS. 6A and 6B starts. When the user selects a "NO" button 703, the CPU 101 terminates the processing without executing initialization processing of user's recorded data.

FIG. 8A depicts a view showing a screen example displaying information indicating that there is a job, which is displayed in step S602 in FIG. 6A in the image forming apparatus 100 according to this embodiment.

In step S601 in FIG. 6A, the CPU 101 determines whether processing of a job or the like is executed or a job is waiting for execution. If the CPU 101 determines that there is a job, the process advances to step S602 to display, for example, a screen like that shown in FIG. 8A on the display unit 105.

FIG. 8B depicts a view showing a screen example indicating that initialization processing of user's recorded data is being executed in the image forming apparatus 100 according to this embodiment.

Upon inhibiting the reception of a job in step S603 in FIG. 6A, in step S604 the CPU 101 displays on the display unit 105, for example, a screen like that shown in FIG. 8B to notify the user that initialization processing of user's recorded data being executed.

FIG. 8C depicts a view showing a screen example to be displayed on the display unit 105 when the initialization of user data fails in step S606, S608, S610, S616, S620, or S622 in FIGS. 6A and 6B in the image forming apparatus 100 according to this embodiment. Note that it is also possible to display, on this screen, information indicating a cause of the failure and the contents of the error.

FIG. 8D depicts a view showing a startup screen example displayed in step S613 in FIG. 6B in the image forming apparatus 100 according to this embodiment.

Note that instead of displaying such a startup screen in step S613, it is possible to determine whether or not the user data initialization flag 202 is ON and, if so, to display a screen indicating that user data is being initialized.

As has been described above, according to this embodiment, it is possible to completely initialize data in the non-volatile storage device. In addition, since information indicating the use history of the device is returned to the state before the initialization, it is possible to discriminate the device from a new product even after the initialization of data.

In addition, since data is erased on a partition basis, using, for example, the wear leveling function makes it possible to reliably erase erasure target data in a non-volatile storage device even if logical addresses at which data is written do not coincide with physical addresses.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-143402, filed Jul. 17, 2015, which is hereby incorporated by reference herein in its entirety.

What is claimed is:

1. An information processing apparatus comprising:
an eMMC (embedded Multi Media Card) that includes a non-volatile memory and a memory controller;

a ROM (Read Only Memory) that stores an initial value of setting data of the information processing apparatus; and at least one processor that executes instructions stored in the ROM or the eMMC to:

store, in a backup area of the eMMC, in a case that an instruction to initialize the eMMC is issued, data stored in the eMMC indicating a use history of the information processing apparatus;

erase, in accordance with the instruction to initialize the eMMC, data stored in at least one partition of the eMMC, wherein backup data in the backup area and data indicating a plurality of pieces of partition information of the eMMC recorded on an MBR (master boot record) of the eMMC are not erased in accordance with the instruction;

create the same partition in the eMMC that existed before the erasing; and write, in the created partition in the eMMC, the setting data stored in the ROM and the data indicating the use history stored in the backup area of the eMMC.

2. The apparatus according to claim 1, wherein the at least one processor executes instructions to erase the partition corresponding to the backup area and data stored in the backup area, after the data indicating the use history has been written in the created partition.

3. The apparatus according to claim 1, wherein the at least one processor executes instructions to create the same partition in the eMMC that existed before the erasing based on information of the MBR.

4. The apparatus according to claim 1, wherein the at least one processor executes instructions to receive an instruction issued by a user to initialize the eMMC.

5. The apparatus according to claim 1, wherein the information processing apparatus is an image forming apparatus.

6. The apparatus according to claim 5, wherein the use history includes information indicating a total number of printed sheets printed by the information processing apparatus.

7. A method of initializing an eMMC (embedded Multi Media Card) that includes a non-volatile memory and a memory controller in an information processing apparatus that includes a ROM (Read Only Memory) that stores an initial value of setting data of the information processing apparatus, the method comprising:

storing, in a backup area of the eMMC, data stored in the eMMC indicating a use history of the information processing apparatus, in a case that an instruction to initialize the eMMC is issued;

erasing, in accordance with the instruction to initialize the eMMC, data stored in at least one partition of the eMMC, wherein backup data in the backup area and data indicating a plurality of pieces of partition information of the eMMC recorded on an MBR (master boot record) of the eMMC are not erased in accordance with the instruction;

creating the same partition that existed before the erasing in the eMMC; and writing, in the created partition in the eMMC, the setting data stored in the ROM and the data indicating the use history stored in the backup area of the eMMC.

8. A non-transitory computer readable storage medium storing a program for causing a computer to execute a method of initializing an eMMC (embedded Multi Media Card) that includes a non-volatile memory and a memory controller in an information processing apparatus that includes a ROM (Read Only Memory) that stores an initial value of setting data of the information processing apparatus, the method comprising:

storing, in a backup area of the eMMC, data stored in the eMMC indicating a use history of the information processing apparatus, in a case that an instruction to initialize the eMMC is issued;

erasing, in accordance with the instruction to initialize the eMMC, data stored in at least one partition of the eMMC, wherein backup data in the backup area and data indicating a plurality of pieces of partition information of the eMMC recorded on an MBR (master boot record) of the eMMC are not erased in accordance with the instruction;

creating the same partition in the eMMC that existed before the erasing of the eMMC; and writing, in the created partition in the eMMC, the setting data stored in the ROM and the data indicating the use history stored in the backup area of the eMMC.

* * * * *